June 6, 1939.  C. H. WIDMAN  2,161,648
WEATHER STRIP
Filed Aug. 16, 1937
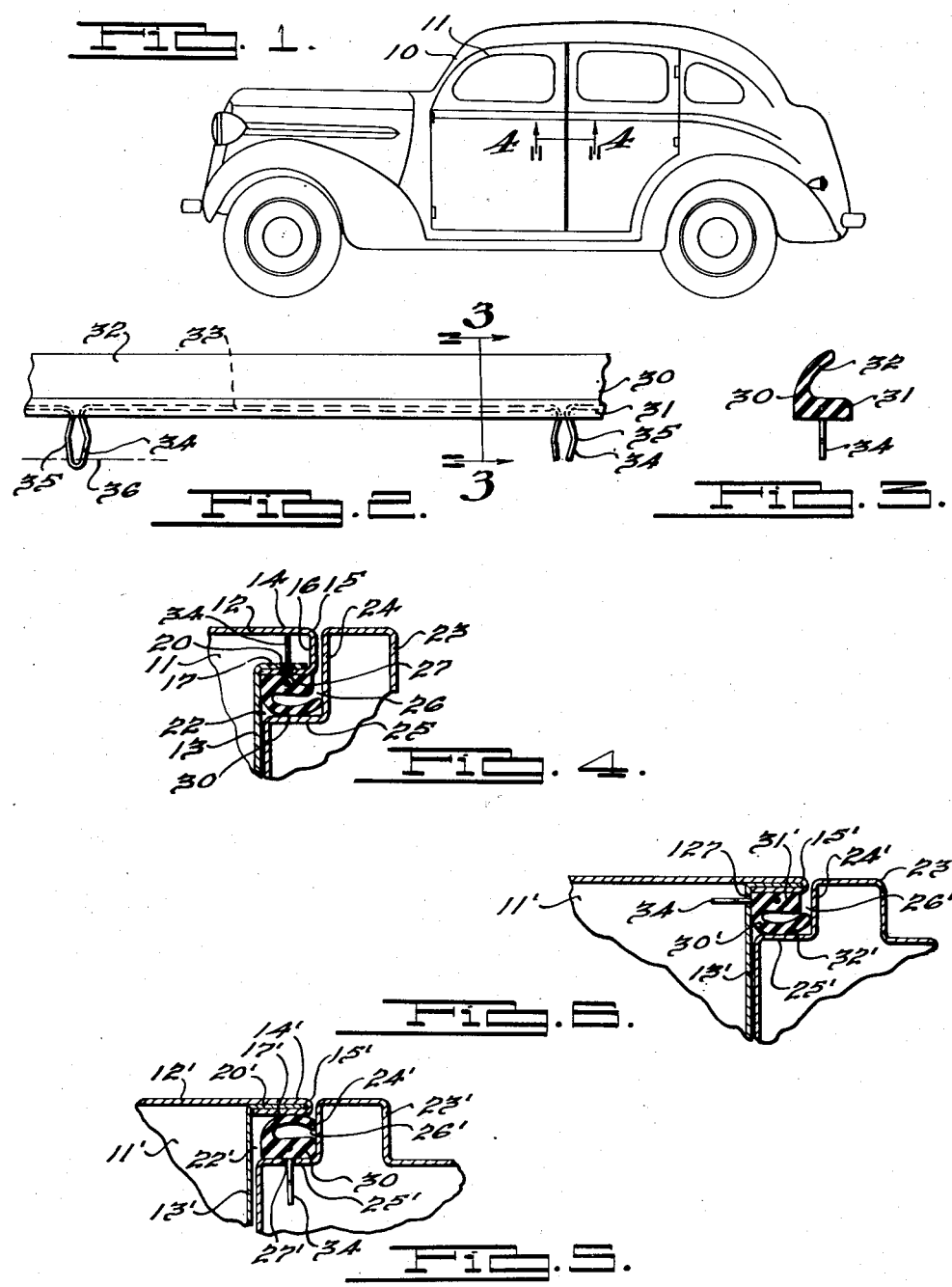
INVENTOR
Charles H. Widman.
BY
Harness, Dickey & Pierce.
ATTORNEYS.

Patented June 6, 1939

2,161,648

UNITED STATES PATENT OFFICE 2,161,648

WEATHER STRIP

Charles H. Widman, Detroit, Mich., assignor to The Murray Corporation of America, Detroit, Mich., a corporation of Delaware Application August 16, 1937, Serial No. 159,204

3 Claims. (Cl. 296—44)

The present invention relates to weatherstripping or sealing strips adapted to be employed in conjunction with closure members of an automobile body and to the methods of forming such weatherstripping and attaching the same to closure members or the frames therefor.

The principal object of the present invention is to improve the art of weatherstripping closure members of an automobile body.

A further object of the invention is to provide a novel form of weatherstripping which has embodied therein integral reinforcing and attaching means.

Another object of the invention is to provide a method of embodying reinforcing and attaching means in weatherstripping or sealing means for a closure member of an automotive vehicle body.

It is also an object of the invention to provide weatherstripping which includes a metallic reinforcing means embodied therein and so modified during the construction of the weatherstripping as to provide means for attaching the latter to a closure member or the frame therefor.

For the purpose of illustrating the genus of the invention, typical concrete embodiments are shown in the accompanying drawing, in which:

Figure 1 is perspective of an automotive vehicle body in which a closure member, such as a door, has been weatherstripped in accordance with the principles of the present invention;

Fig. 2 is a fragmentary side elevation of one form of weatherstripping which may be employed for the above purpose;

Fig. 3 is a section taken on line 3—3 of Fig. 2;

Fig. 4 is a fragmentary section taken on the line 4—4 of Fig. 1; and

Figs. 5 and 6 are similar fragmentary sections of another form of door and door frame construction, this construction differing from that shown in Fig. 4 in that a thinner outer or overlapped flange is provided on the door or similar closure, and the jamb or frame element for the closure element is less deeply rabbeted than is the case of the construction shown in Fig. 4, Fig. 5 illustrating the same form of weatherstripping as shown in Fig. 4, while Fig. 6 illustrates a modified form of weatherstripping.

Referring to the drawing in which like reference numerals indicate the corresponding parts throughout the several views, and more especially to Figs. 1 and 4, there is illustrated an automotive vehicle 10 of the closed body type provided with a closure such as door 11. The door 11 preferably includes sheet metal panels, the outer panel being illustrated at 12 and the inner panel at 13 in Fig. 4. As viewed in Fig. 4, the door 11 is provided with an outer or overlapped flange 15 which is of open or box-like section and comprises the body portion 14, the inwardly extending portion 16 and the rearwardly extending portion 17. Inner panel 13 is provided with a forwardly extending flange 20 to be received within the portions 14, 16 and 17 of flange 15. The flange 20 is preferably spot welded to the rearwardly extending portion 17 at various points. The rearwardly disposed face of the inner panel 13 and the inwardly disposed face of portion 17 of door flange 15 form a rabbet 22 in which weatherstripping may be received. A door jamb or post 23 is also illustrated in Fig. 4 and has normally disposed wall portions 24 and 25 which provide a rabbet 26 in which the door flange 15 and the weatherstripping to be employed may be received. Openings 27 are provided through the joined flange 20 and portion 17 of door flange 15 for the reception of fastening means for securing the weatherstripping to the overlapped flange 15 of door 11.

Reference also may now be had to Figs. 2 and 3 which illustrate the weatherstripping 30 which may be disposed in the cooperating rabbets 22 and 26. The weatherstripping 30 is composed of an initially plastic material which may be molded, preferably by extrusion, so that it assumes the cross-sectional form indicated in Fig. 3. As illustrated in this figure, the weatherstripping 30 comprises a substantially rectangular shaped body 31 and a sealing flap 32 which extends upwardly and at approximately a forty-five degree angle from one corner of the body portion 31, the flap 32 being curved so that, when compressed, it makes sealing engagement with both of the wall portions 24 and 25 of door jamb 23. The sealing strip 30 is preferably composed of a vulcanized rubber composition and has in the body portion 31 a reinforcing wire 33 embedded centrally therein. At intervals along the length of the sealing strip or weatherstrip 30, loops 34 of the wire 33 are withdrawn through the base of the rectangular section body portion 31 and the loops 34 are spread adjacent the central portion thereof in a direction substantially longitudinally of the strip. The spreading of the loops 34 is indicated at 35 in Fig. 2. The bight portion of the loop 34 then may be severed, preferably by cutting off the tip of the loop along the dot-and-dash cut-off line 36. This provides a spring clip or fastener as indicated at the right hand end of Fig. 2 which may be inserted more easily into the openings 27 provided in the overlapped flange 15 of closure element 11 for fastening the weatherstripping to the closure member than would be the case if the bight portions of the loops were not severed.

Reference may now be had to Fig. 5 which illustrates a different form of closure element 11', differing from the closure element 11 of the embodiment shown in Fig. 4 in that the return bent portions 14' and 17' of the auto panel 12' enclose and contact both faces of the outwardly turned flange 20' of the inner panel 13'. Thus the outer or overlapped flange 15' is simply the thickness of the three sheets of metal 14', 17' and 20' rather than of box formation as illustrated at 15 in Fig. 4. The frame for the closure element, as, for example, the door post or jamb 23', has a more shallow rabbet channel 26' than in the case of the previously described embodiment and openings 27' are formed in the wall portions 25' for the reception of fastening elements 34 so that the waterstripping 30 is reversed in position with reference to that disclosed in the embodiment shown in Fig. 4. In the embodiment shown in Fig. 5, the sealing flap 32 is pressed into sealing contact with the inner surface of the overlapped flange 15' and with the wall portion 24' of door post or jamb 23'.

Referring to Fig. 6, the same form of closure element 11' and frame or jamb element 23' is illustrated as was shown in the embodiment depicted in Fig. 5. A modified form of weatherstripping 30', however, is disclosed in which the fastening element 34 projects laterally through a narrow face of the body 31' of the weatherstripping, which face is adjacent the face of the sealing strip 32'. Openings 127 are provided in the inner panel 13' of the closure member 11' adjacent the outer or overlapped flange 15' in order to fasten the weatherstripping 30' to the closure member. The sealing flap 32' in this instance makes sealing engagement with the wall portion 25' and 24' of the rabbet channel 26' of frame element 23' when the closure member 11 is in shut or closed position. Except for the fact that the fastening element 34 projects through the narrower side of the body portion 31' adjacent the base of the flap 32' instead of through the broader base surface of the body 31', the weatherstripping 30' is of the same form and construction as the weatherstripping 30, previously described.

The weatherstripping 30 or 30' may be employed in conjunction with other closure members than doors, as for example, with windshields, engine hoods, ventilators, luggage compartment doors, rumble seat backs, and the like.

As many changes could be made in the above constructions and many apparently widely different embodiments of this invention could be made without departing from the scope thereof, it is intended that all matter contained in the above description or shown in the accompanying drawing shall be interpreted as illustrative of the applicant's article and method and not in a limiting sense.

What is claimed is:

1. A resilient weatherstrip element adapted for securement to a sheet metal member having a series of apertures therealong, said element comprising a strip of resilient material having a wire reinforcing member extending longitudinally therealong and embedded therein said reenforcing wire having severed loops extending exteriorly thereof at intervals therealong serving to provide snap fasteners adapted for insertion into the apertures in said sheet metal member.

2. A resilient weatherstrip element adapted for securement to a sheet metal member having a series of apertures therealong, said element comprising a strip of resilient material having a relatively thick longitudinally extending base portion, said base portion having a longitudinally extending wire reenforcing element embedded therein, said wire element having portions extending from said strip at spaced points along its length, the portion of said wire extending from said strip being preformed to provide snap fasteners adapted for insertion into the apertures in said sheet metal member.

3. A resilient weatherstrip element adapted for securement to a sheet metal member having a series of apertures therealong, said element comprising a strip of rubber-like resilient material of generally L-shaped cross-section and having a relatively thick longitudinally extending base portion, said base portion having a longitudinally extending wire reenforcing element embedded therein, said reenforcing element having portions projecting outwardly from said strip at intervals throughout its length, said outwardly projecting portions each being preformed to provide a pair of independently resilient projections serving together to provide a snap fastener adapted to anchor within one of the apertures in said sheet metal member.

CHARLES H. WIDMAN.